United States Patent Office 3,316,228
Patented Apr. 25, 1967

3,316,228
DIPEROXYCARBONIC ACID ANHYDRIDES AND POLYMERIZATION PROCESSES EMPLOYING SAME
James E. Guillet and Edmund B. Towne, Kingsport, Tenn., assignors to Eastman Kodak Company, Rochester, N.Y., a corporation of New Jersey
No Drawing. Filed Dec. 14, 1962, Ser. No. 244,593
16 Claims. (Cl. 260—89.1)

This invention relates to novel compositions of matter. More particularly, this invention relates to a novel class of organic peroxides which are mixed anhydrides of diperoxy carbonic acid with other organic acids. In a specific aspect, this invention relates to novel peroxides that are of special utility in the polymerization of ethylenically unsaturated polymerizable compounds such as ethylene, acrylates, vinyl esters and the like.

In many commercial polymerizations, such as the polymerization of ethylene or styrene, for example, free radical catalysts or promoters such as di-t-butyl peroxide, lauroyl peroxide and tertiary butyl peracetate are employed. It is general practice when such compounds are employed to use very small concentrations so that the catalyst or promoter residues left in the polymer do not have to be removed therefrom after polymerization is completed. However, certain of the residues of these free radical promoters contain functional groups, such as acid or ester carbonyl, which tend to adversely affect the electrical properties of the polymer product. For example, in producing polyethylene in this manner the presence of acid or ester carbonyl tends to increase the dielectric loss factor of the polymer and this seriously interferes with its use in electrical applications such as in telephone-wire insulation, high-frequency cables, television cables and the like. Consequently, it is highly desirable to provide a catalyst for the polymerization of ethylenically unsaturated monomers such as ethylene, which gives a very high yield of polymer per gram of catalyst or promoter. This will, of course, reduce the total amount of any undesirable residues left in the polymer after polymerization is completed.

Accordingly, it is an object of this invention to provide a new and improved class of organic peroxides, particularly organic peroxides which function as catalysts with a high degree of efficiency in the polymerization of ethylenically unsaturated polymerizable compounds.

Another object of this invention is to provide new and improved organic peroxide promoters which are especially efficacious in the polymerization of ehtylenically unsaturated polymerizable compounds such as ethylene, styrene, methyl methacrylate and other acrylates, vinyl acetate and other vinyl esters.

Another object of this invention is to provide a new class of organic peroxide promoters for the production of polymers from ethylene, styrene, acrylates and the like which will have substantially reduced contamination resulting from catalyst residues.

A further object is to provide a new class of organic peroxides having utility in promoting other free radical reactions such as chlorination, bromination, telomerization and the like.

Still another object of this invention is to provide polymerization processes employing organic peroxide catalysts exhibiting high efficiency.

Other objects will become apparent from an examination and consideration of the specifications and claims that follow.

The novel organic peroxides of this invention are mixed anhydrides of diperoxycarbonic acid with carboxylic acids and have the formula:

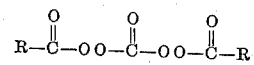

where R is the same or different aliphatic, cycloaliphatic or aromatic radical, desirably containing 4–20 carbon atoms. Such peroxides are not shock sensitive and exhibit an extremely high efficiency as catalysts in the polymerization of ethylenically unsaturated monomers, particularly those containing a $CH_2=C<$ group, or more preferably a $CH_2=C-$, group and 2–10 carbon atoms such as ethylene.

As already indicated the R groups in the above formula usualy contain 4–20 carbon atoms. However, R groups of 5–15 or even 5–10 carbon atoms will generally give good results, particularly where the peroxide is used as a catalyst to polymerize ethylene. The R groups that are most suitable contain only carbon and hydrogen although substituents which can be present include alkoxy, carbonyl, ester, carboxyl, nitro, amino, halogen, and the like, since such substituents do not adversely affect the compositions. Suitable R groups include methyl, ethyl, propyl, isopropyl, butyl, decyl, dodecyl, tetradecyl, tolyl; methyl-propyl, and dibutyl substituted phenyl, phenyl, cyclopentyl, cyclohexyl, cycloheptyl, eicosyl, diphenyl, naphthyl and the like. Examples of the novel peroxides of this invention include the dianhydride of peroxycarbonic acid and with lauric acid, the dianhydride of peroxycarbonic acid with acetic acid, the dianhydride of peroxycarbonic acid with propionic acid and the like.

The novel peroxides of this invention can be prepared by several methods. For example, they can be prepared by reacting a peracid such as perlauric or peracetic with phosgene in the presence of a suitable acceptor for hydrogen chloride such as pyridine or sodium hydroxide. The reaction is preferably carried out in an alkaline medium such as a solution of pyridine in a hydrocarbon solvent such as heptane, benzene or hexane. These novel peroxides can also be prepared by reacting diperoxycarbonic acid with a monobasic acid chloride or anhydride under alkaline conditions. Thus, the peranhydride of diperoxycarbonic acid with lauric acid can be made either by reacting phosgene with perlauric acid or alternatively by reacting diperoxycarbonic acid with lauroyl chloride.

The peroxides of this invention can also be prepared in a two phase system using aqueous sodium hydroxide and an hydrocarbon solvent such as benzene, hexane, or heptane. These peroxides are further prepared by reacting the sodium salt of a peracid such as peracetic, perlauric, perbenzoic with phosgene a slurry in benzene or heptane. The detailed preparation of several specific peroxides of this invention are set forth in the following examples.

Solutions of the novel peroxides of this invention are usually stable at low temperatures and can be easily stored for long periods if reasonable precautions are taken to avoid overheating or exposure to flame or ultraviolet light. These peroxides can be used in solution or in bulk polymerization at temperatures in the range of about 0° or even 30° to 250° C. or above. In general, these peroxides give yields of from 2 to 5 times as much polymer per gram of catalyst as do other peroxides commonly used as catalysts for the polymerization of vinyl monomers.

It will, of course, be understood that the novel peroxides of this invention will not all have the same activity at a given temperature. For example, those containing substituents alpha to the carbonyl groups will generally decompose at lower temperatures than those in which the alpha carbons contain only hydrogen. Furthermore, a significant feature of the peroxides of this invention is their insensitivity to shock which makes them safe, potentially valuable commercial catalysts. In contrast, compounds in which R of the above formula contains from 1–3 carbon atoms are generally sensitive to mechanical shock and are, therefore, subject to detonation in pumps and other equipment used in commercial operations for polymerizing ethylenically unsaturated compounds. In fact, such compounds are so active that they decompose to give large volumes of gaseous products and are of interest as explosives or propellants.

Although the new compounds of the invention are of particular interest as catalysts for the polymerization of ethylenically unsaturated monomers, they can also be used in any processes requiring peroxide or free-radical generators, such as, for example, in catalyzing the chlorination of hydrocarbons, in bleaching various materials, in cross-linking various polymer resins and the like.

The following procedures are typical of those which can be employed in accordance with the invention in the polymerization of various ethylenically unsaturated polymerizable compounds.

(A) The polymerization of ethylene is accomplished as follows: A 100-cc. stainless steel autoclave equipped with a magnetic agitator is charged with the catalyst in toluene solution. The autoclave is flushed with ethylene, then pressured to the desired level and the temperature raised in reaction temperature. The reaction pressure is maintained by addition of compressed gas for a period of two hours after which time the reactor is cooled down and the unreacted ethylene vented. The polymer is recovered from the autoclave in the form of a dry, spongy mass.

(B) The polymerization of ethylenically unsaturated monomers other than ethylene can be accomplished as follows: One-tenth gram of the peroxide in toluene solution is placed in a vial and the toluene removed by pumping under vacuum. Twenty grams of purified monomer is charged and the vial sealed after flushing with nitrogen. The vials are heated for four hours at the desired reaction temperature, cooled to room temperature and opened. The polymer is dissolved in a suitable solvent such as acetone, toluene or benzene, precipitated with methanol, filtered, dried and weighed.

This invention can be further illustrated by the following examples of preferred embodiments thereof although it will be understood that these examples are included merely for purposes of illustration and are not intended to limit the scope of the invention unless otherwise specifically indicated:

EXAMPLE 1

The dianhydride of diperoxycarbonic acid with lauric acid is prepared by reaction of perlauric acid with phosgene in solution in toluene with pyridine. After reaction for 4 hours at 0° C. the toluene layer is separated from the reaction mixture and washed with water until neutral. The yield of peranhydride is 34.5 percent based on titration of the peroxy groups with potassium iodide. Polymerization runs with this peroxide are made with ethylene as using Procedure (A), described above, with 2 mg. of catalyst and a pressure of 20,000 lbs./sq. in., the following yields are obtained at the temperature indicated:

| Temp., ° C. | Yield, G. | Catalyst Efficiency, G./G. Catalyst |
|---|---|---|
| 105 | 1.68 | 840 |
| 125 | 1.82 | 910 |
| 145 | 2.30 | 1,150 |
| 180 | 9.10 | 4,550 |

The novel peroxides of this invention are much more efficient catalysts than conventional prior art catalysts such as lauroyl peroxide. To illustrate, the above procedure is repeated with lauroyl peroxide and the results are as follows:

| Temp., ° C. | Yield, G. | Catalyst Efficiency, G./G. Catalyst |
|---|---|---|
| 125 | 0.81 | 450 |
| 145 | 1.32 | 660 |
| 180 | 3.2 | 1,600 |

EXAMPLE 2

The dianhydride of caproic acid and diperoxycarbonic acid is made by reaction of percaproic acid with phosgene and pyridine in toluene solution. The yield of peroxide is 45 percent. Polymerization runs are made using Procedure (A) with ethylene at 20,000 lbs./sq. in. pressure and 2 mg. of catalyst. The results are as follows:

| Temp., ° C. | Yield, G. | Efficiency G./G. of Catalyst |
|---|---|---|
| 120 | 3.60 | 1,800 |
| 140 | 5.41 | 2,700 |
| 180 | 22.31 | 11,150 |

EXAMPLE 3

The dianhydride of caproic acid and diperoxycarbonic acid is used as a catalyst for the polymerization of styrene, methyl methacrylate, and vinyl acetate by the Procedure (B), described above. The yields and viscosities of the polymers produced are given in the table below:

| Monomer | Yield, G. | Viscosity |
|---|---|---|
| Styrene | 14.2 | 0.62 |
| Methyl Methacrylate | 16.6 | 1.32 |
| Vinyl Acetate | 15.2 | 0.72 |

EXAMPLE 4

The dianhydride of benzoic acid and diperoxycarbonic acid is prepared by reaction of perbenzoic acid with phosgene and pyridine in toluene solution. After washing with water the yield of peroxide is 57 percent. The dianhydride of benzoic acid and diperoxycarbonic acid is used as a catalyst for the polymerization of styrene, methyl methacrylate, and vinyl acetate using Procedure (B) described above. The yields and viscosities of the resulting polymers are set forth in the table below:

| Monomer | Yield, G. | Viscosity |
|---|---|---|
| Styrene | 17.4 | 0.52 |
| Methyl Methacrylate | 16.2 | 1.54 |
| Vinyl Acetate | 19.1 | 0.37 |

EXAMPLE 5

The dianhydride of 2,4-dichlorobenzoic acid and diperoxycarbonic acid is prepared by reaction of 2,4-dichloroperoxybenzoic acid with phosgene in pyridine solution. After washing with water to remove the pyridine, the yield of peroxide is 67 percent. Polymerization runs with this peroxide using styrene, methyl methacrylate, and vinyl acetate are carried out by Procedure (B), described above. The yields and viscosities of the polymers produced are set forth in the following table.

| Monomer | Yield, G | Viscosity |
|---|---|---|
| Styrene | 19.2 | 0.43 |
| Methyl Methacrylate | 19.6 | 1.32 |
| Vinyl Acetate | 18.7 | 0.42 |

EXAMPLE 6

The dianhydride of p-nitrobenzoic acid and diperoxycarbonic acid is prepared by reaction of p-nitroperoxybenzoic acid with phosgene and pyridine in toluene solution. After removal of the pyridine by washing with water, the yield of peroxide is 27 percent. The peroxide is used for the polymerization of methyl methacrylate, styrene, and vinyl acetate by Procedure (B), described above. The results are given in the table below:

| Monomer | Yield, G. | Viscosity |
|---|---|---|
| Styrene | 17.4 | 0.27 |
| Methyl Methacrylate | 18.2 | 1.17 |
| Vinyl Acetate | 19.2 | 0.32 |

EXAMPLE 7

1.3 g. of peroxy cyclohexane carboxylic acid is dissolved in 10 ml. benzene and added to 34 ml. 5 percent sodium hydroxide solution cooled to 5° C. 10.2 ml. of a benzene solution containing 20 percent phosgene is added dropwise over a period of 20 minutes and the resulting mixture agitated rapidly for 4 hours while maintaining the temperature at 5° C. The water layer is separated and the organic layer washed twice with 20 ml. cold water. Titration indicates a 56 percent yield of the dianhydride of cyclohexane carboxylic acid with diperoxy carbonic acid.

EXAMPLE 8

The dianhydride of 2-ethyl hexanoic acid with diperoxy-carbonic acid is made by the following procedure:

1.5 g. of the sodium salt of peroxy 2-ethyl hexanoic acid is slurried in 10 ml. toluene at −15° C. 11.0 ml. of 20 percent solution of phosgene in toluene is added dropwise and the solution stirred at −15° C. for 6 hours, after which it is washed twice with cold water and dried over anhydrous magnesium sulfate. The yield of peroxide is 55 percent based on titration.

From the above examples it can be seen that the novel peroxides of this invention will quantitatively liberate iodine from potassium iodide, which can be used to determine the yield of peroxide, and exhibit a characteristic infra-red spectrum which shows two carbonyl doublet, generally in the range of 5.6 to 6.1$\mu$.

As indicated by the foregoing description, it will be apparent that the novel organic peroxides of this invention can be employed in the polymerization of a wide variety of ethylenically unsaturated compounds and that such polymerizations may be carried out under varying conditions of temperature and pressure. The specific conditions will be selected by reference to the particular organic peroxide employed in a given polymerization as will be apparent to those skilled in the art. As to the matter of pressure, for example, the novel organic peroxides of this invention can generally be employed at pressures in the range of about atmospheric to about 3,000 atmospheres, although pressures of at least 1500 atmospheres are usually employed in polymerizing ethylene. The polymerization reaction can be carried out in the presence of about 5 p.p.m. to about 5 percent, by weight, of catalyst, based on monomer feed.

Thus, this invention provides an unusually valuable class of organic peroxides which can be employed as promoters for radical reactions. These novel peroxides are characterized by unusual and unexpectedly high efficiencies. Since it is well known that radical reactions suffer from relatively low efficiencies in many cases, the provision of promoters having the unusually high efficiency of the promoters of this invention will make many processes commercially feasible which are now considered to be too expensive for commercial utility. In the case of polyethylene and polystyrene and other vinyl polymers, it will be obvious that a substantial improvement in polymer properties will be made possible as a result of the substantially lower amount of catalyst residues present in the final product which is a result of the high efficiencies of the peroxides of this invention when used as polymerization promoters.

Although the invention has been described in considerable detail with particular reference to certain preferred embodiments thereof, variations and modifications can be effected within the spirit and scope of the invention as described hereinabove, and as defined in the appended claims.

We claim:

1. Organic peroxides having the formula:

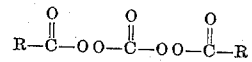

where each R is a member selected from the group consisting of aliphatic, cycloaliphatic, and aromatic radicals of 4 to 20 carbon atoms.

2. The dianhydride of diperoxycarbonic acid with lauric acid.

3. The dianhydride of caproic acid with diperoxycarbonic acid.

4. The dianhydride of benzoic acid with diperoxycarbonic acid.

5. The dianhydride of 2,4-dichlorobenzoic acid with diperoxycarbonic acid.

6. The dianhydride of p-nitrobenzoic acid with diperoxycarbonic acid.

7. The dianhydride of cyclohexane carboxylic acid with diperoxycarbonic acid.

8. The dianhydride of 2-ethyl hexanoic acid with diperoxy carbonic acid.

9. The process of polymerizing an unsaturated polymerizable compound containing a $CH_2=C<$ group which comprises polymerizing said compound at a temperature in the range of about 0° C. to about 250° C. in the presence of an organic peroxide having the formula:

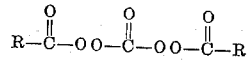

where each R is a member selected from the group consisting of aliphatic, cycloaliphatic, and aromatic radicals of 4 to 20 carbon atoms.

10. The process of claim 9 wherein the organic peroxide is the dianhydride of diperoxycarbonic acid with lauric acid.

11. The process of claim 9 wherein the organic peroxide is the dianhydride of caproic acid with diperoxycarbonic acid.

12. The process of claim 9 wherein the organic peroxide is the dianhydride of benzoic acid with diperoxycarbonic acid.

13. The process of claim 9 wherein the organic peroxide is the dianhydride of 2,4-dichlorobenzoic acid with diperoxycarbonic acid.

14. The process of claim 9 wherein the organic peroxide is the dianhydride of p-nitrobenzoic acid with diperoxycarbonic acid.

15. The process of claim 9 wherein the organic peroxide is the dianhydride of cyclohexane carboxylic acid with diperoxycarbonic acid.

16. The process of claim 9 wherein the organic peroxide is the dianhydride of 2-ethyl hexanoic acid with diperoxycarbonic acid.

(References on following page)

References Cited by the Examiner

UNITED STATES PATENTS

| | | | |
|---|---|---|---|
| 2,592,069 | 4/1952 | Reid et al. | 260—89.1 |
| 2,862,973 | 12/1958 | Winkler et al. | 260—610 |
| 3,003,000 | 10/1961 | Milas | 260—610 |
| 3,062,797 | 11/1962 | Stanek | 260—89.1 |
| 3,089,865 | 5/1963 | Walther et al. | 260—87.1 |

JOSEPH L. SCHOFER, *Primary Examiner.*

WILLIAM H. SHORT, J. F. McNALLY,
*Assistant Examiners.*